(12) United States Patent
Abhishek et al.

(10) Patent No.: US 9,297,083 B2
(45) Date of Patent: Mar. 29, 2016

(54) ELECTROLYTIC GAS GENERATING DEVICES, ACTUATORS, AND METHODS

(71) Applicant: PALO ALTO RESEARCH CENTER INCORPORATED, Palo Alto, CA (US)

(72) Inventors: Ramkumar Abhishek, Mountain View, CA (US); Frederick Joseph Endicott, San Carlos, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 141 days.

(21) Appl. No.: 14/107,367

(22) Filed: Dec. 16, 2013

(65) Prior Publication Data
US 2015/0167184 A1    Jun. 18, 2015

(51) Int. Cl.
| | |
|---|---|
| *F01B 29/10* | (2006.01) |
| *F01K 25/00* | (2006.01) |
| *C25B 9/18* | (2006.01) |
| *C25B 9/10* | (2006.01) |
| *C25B 1/02* | (2006.01) |
| *C25B 1/10* | (2006.01) |
| *C25B 1/46* | (2006.01) |
| *C25B 11/03* | (2006.01) |
| *C25B 1/06* | (2006.01) |
| *C25B 9/04* | (2006.01) |

(Continued)

(52) U.S. Cl.
CPC . *C25B 9/063* (2013.01); *C25B 1/04* (2013.01); *C25B 9/06* (2013.01); *F03G 7/005* (2013.01)

(58) Field of Classification Search
CPC ......... F01B 29/10; F03G 7/005; F01K 25/00; C25B 9/00; C25B 9/04; C25B 9/18; C25B 9/08; C25B 9/10; C25B 1/02; C25B 1/06; C25B 1/10; C25B 1/46; C25B 11/035; C02F 2201/46115; C02F 1/46109; C02F 2001/46157
USPC .................. 204/244, 253, 256, 267, 283, 284
See application file for complete search history.

(56) References Cited

U.S. PATENT DOCUMENTS

| | | | |
|---|---|---|---|
| 4,304,232 | A | 12/1981 | Michaels |
| 4,308,867 | A | 1/1982 | Roseman et al. |

(Continued)

FOREIGN PATENT DOCUMENTS

| | | |
|---|---|---|
| DE | 4130843 A1 | 3/1993 |
| WO | 94/01165 A1 | 1/1994 |

(Continued)

OTHER PUBLICATIONS

U.S. Appl. No. 13/629,124, Palo Alto Research Center Incorp.

(Continued)

*Primary Examiner* — Zulmariam Mendez
(74) *Attorney, Agent, or Firm* — Sutherland Asbill & Brennan LLP

(57) ABSTRACT

Devices and methods are provided for generating gas(es). A device includes a first layer having a conductive region and an electrode, a sealing layer adjacent the first layer and having a conductive region and a multi-electrode assembly including an ionic layer with a cathode side and an opposed anode side, and a second layer adjacent the sealing layer and having a conductive region and an electrode operably associated with an isolated electrical connector, wherein the device is configured to generate the gas(es) upon application of a voltage to the electrical connector and to the conductive regions of the layers.

23 Claims, 5 Drawing Sheets

(51) Int. Cl.
    *C25B 9/06*     (2006.01)
    *C25B 1/04*     (2006.01)
    *F03G 7/00*     (2006.01)

(56) References Cited

U.S. PATENT DOCUMENTS

| | | |
|---|---|---|
| 4,402,695 A | 9/1983 | Wong |
| 4,687,423 A | 8/1987 | Maget et al. |
| 4,886,514 A | 12/1989 | Maget |
| 4,892,778 A | 1/1990 | Theeuwes et al. |
| 4,902,278 A | 2/1990 | Maget et al. |
| 5,002,540 A | 3/1991 | Brodman et al. |
| 5,062,834 A | 11/1991 | Gross et al. |
| 5,090,963 A | 2/1992 | Gross et al. |
| 5,112,614 A | 5/1992 | Magruder et al. |
| 5,135,499 A | 8/1992 | Tafani et al. |
| 5,162,116 A | 11/1992 | Shepherd et al. |
| 5,318,557 A | 6/1994 | Gross |
| 5,354,264 A | 10/1994 | Bae et al. |
| 5,415,629 A | 5/1995 | Henley |
| 5,522,804 A | 6/1996 | Lynn |
| 5,593,552 A | 1/1997 | Joshi et al. |
| 5,780,058 A | 7/1998 | Wong et al. |
| 5,816,248 A | 10/1998 | Anderson et al. |
| 5,928,195 A | 7/1999 | Malamud et al. |
| 5,951,538 A | 9/1999 | Joshi et al. |
| 6,030,375 A | 2/2000 | Anderson et al. |
| 6,086,909 A | 7/2000 | Harrison et al. |
| 6,139,538 A | 10/2000 | Houghton et al. |
| 6,183,434 B1 | 2/2001 | Eppstein |
| 6,322,532 B1 | 11/2001 | D'Sa et al. |
| 6,352,524 B1 | 3/2002 | Bunt et al. |
| 6,383,347 B1 * | 5/2002 | Stuart ............... C25B 9/20 204/237 |
| 6,423,039 B1 | 7/2002 | Rathbone et al. |
| 6,444,224 B1 | 9/2002 | Rathbone et al. |
| 6,450,991 B1 | 9/2002 | Bunt et al. |
| 6,532,386 B2 | 3/2003 | Sun et al. |
| 6,591,133 B1 | 7/2003 | Joshi |
| 6,638,246 B1 | 10/2003 | Naimark et al. |
| 6,743,211 B1 | 6/2004 | Prausnitz et al. |
| 6,756,053 B2 | 6/2004 | Zhang et al. |
| 6,776,164 B2 | 8/2004 | Bunt et al. |
| 6,805,877 B2 | 10/2004 | Massara et al. |
| 6,835,392 B2 | 12/2004 | Hsu et al. |
| 6,962,579 B2 | 11/2005 | Jellie |
| 6,978,172 B2 | 12/2005 | Mori et al. |
| 7,004,171 B2 | 2/2006 | Benita et al. |
| 7,083,575 B1 | 8/2006 | Claycomb et al. |
| 7,083,590 B1 | 8/2006 | Bunt et al. |
| 7,486,989 B2 | 2/2009 | Sun et al. |
| 7,497,855 B2 | 3/2009 | Ausiello et al. |
| 7,732,408 B2 | 6/2010 | Josephson et al. |
| 2002/0010414 A1 | 1/2002 | Coston et al. |
| 2002/0045883 A1 | 4/2002 | Jellie et al. |
| 2003/0018295 A1 | 1/2003 | Henley et al. |
| 2003/0130558 A1 | 7/2003 | Massara et al. |
| 2003/0219472 A1 | 11/2003 | Paulelli et al. |
| 2004/0059388 A1 | 3/2004 | Herbst et al. |
| 2004/0082937 A1 | 4/2004 | Ausiello et al. |
| 2004/0087893 A1 | 5/2004 | Kwon |
| 2004/0219192 A1 | 11/2004 | Horstmann et al. |
| 2005/0000514 A1 | 1/2005 | Sullivan et al. |
| 2005/0054969 A1 | 3/2005 | Hoff et al. |
| 2005/0124875 A1 | 6/2005 | Kawano et al. |
| 2005/0244502 A1 | 11/2005 | Mathias et al. |
| 2005/0267440 A1 | 12/2005 | Herman et al. |
| 2006/0024358 A1 | 2/2006 | Santini et al. |
| 2006/0184092 A1 | 8/2006 | Atanasoska et al. |
| 2007/0038181 A1 | 2/2007 | Melamud et al. |
| 2007/0173711 A1 | 7/2007 | Shah et al. |
| 2007/0225634 A1 | 9/2007 | Ferren et al. |
| 2007/0269385 A1 | 11/2007 | Yun et al. |
| 2008/0004564 A1 | 1/2008 | Smith |
| 2008/0004596 A1 | 1/2008 | Yun et al. |
| 2008/0171950 A1 | 7/2008 | Franco |
| 2008/0262412 A1 | 10/2008 | Atanasoska et al. |
| 2008/0269666 A1 | 10/2008 | Wang et al. |
| 2009/0131737 A1 | 5/2009 | Ferren et al. |
| 2009/0171315 A1 | 7/2009 | Versi |
| 2009/0281528 A1 | 11/2009 | Grovender |
| 2009/0306633 A1 | 12/2009 | Trovato et al. |
| 2009/0308752 A1 | 12/2009 | Evans |
| 2011/0087155 A1 | 4/2011 | Uhland et al. |
| 2011/0087192 A1 | 4/2011 | Uhland et al. |
| 2011/0087195 A1 | 4/2011 | Uhland et al. |
| 2011/0092906 A1 | 4/2011 | Boettger |
| 2012/0032553 A1 * | 2/2012 | Goyal ............... F03G 7/005 310/300 |
| 2012/0228999 A1 * | 9/2012 | Yamamoto ............ F03G 7/005 310/330 |
| 2012/0238912 A1 | 9/2012 | Rajkondawar et al. |
| 2013/0211372 A1 | 8/2013 | Rosenshein |

FOREIGN PATENT DOCUMENTS

| | | |
|---|---|---|
| WO | 94/18952 A1 | 9/1994 |
| WO | 97/41831 A1 | 11/1997 |
| WO | 01/12101 A1 | 2/2001 |
| WO | 2005/056708 A2 | 6/2005 |
| WO | 2005/089728 A2 | 9/2005 |
| WO | 2007/041119 A1 | 4/2007 |
| WO | 2007/047811 A2 | 4/2007 |
| WO | 2007/140416 A2 | 12/2007 |
| WO | 2009/081411 A2 | 7/2009 |
| WO | 2010/048478 A2 | 4/2010 |

OTHER PUBLICATIONS

U.S. Appl. No. 13/629,159, Palo Alto Research Center Incorp.
U.S. Appl. No. 13/629,184, Palo Alto Research Center Incorp.
U.S. Appl. No. 13/742,2303, Palo Alto Research Center Incorp.
U.S. Appl. No. 14/071,929, Palo Alto Research Center Incorp.
Bridges, et al., "Timed-Artificial Insemination in Beef Cows: What are the Options?," Purdue University Cooperative Extension Service, West Lafayette, in (REV 3/08).
Fatakdawala, Hussain et al., "Hydrogen peroxide mediated transvaginal drug delivery," International Journal of Pharmaceutics 409 (2011) 121-127.
Hashimoto et al., "Oxidative stress induces gastric epithelial permeability through claudin-3." Biochemical and Biophysical Research Communications (2008), vol. 376, pp. 154-157.
Kadajji, et al., "Water Soluble Polymers for Pharmaceutical Applications." Polymers (2011), vol. 3, pp. 1972-2009.
SáFilho, O. G. et al., "Fixed-time artificial insemination with estradiol and progesterone for *Bos indicus* cows II: Strategies and factors affecting fertility," Science Direct, Theriogenology 72 (2009) 210-218.
Seth, et al., "Probiotics ameliorate the hydrogen peroxide-induced epithelial barrier disruption by a PKC-and MAP kinase-dependent mechanism," Am J Physiol Gastrointest Liver Physiol (2008), vol. 294, pp. G1060-G1069. Retrieved from http://www.ajpgi.org on Jul. 28, 2009.
Boehmer et al., "Effects of Temperature of Consumed Water on Rumen Temperature of Beef Cows," Oklahoma Agricultural Experiment Station, 2009, 4 pages.
Boehmer, "Ruminal Temperature for Identification and Prediction of Estrus in Beef Cows," 2012, Thesis.
Heckman et al., "Estrous Cycle Patterns in Cattle Monitored by Electrical Resistance and Milk Progesterone," 1979, J. Dairy Sci., 62:64-68.
de Mol et al., "Application of Fuzzy Logic in Automated Cow Status Monitoring," 2001, J. Dairy Sci., 84:400-410.
O'Connor, "Heat Detection and Timing of Insemination for Cattle," 1993, Pennsylvania State University, Extension Circular 402.
Piccione et al., "Daily and Estrous Rhythmicity of Body Temperature in Domestic Cattle," 2003, BioMed Central, (8 pages).
Cooper-Prado et al., "Relationship of Ruminal Temperature with Parturition and Estrus of Beef Cows," 2011, J. Anim. Sci., 89:1020-1027.

* cited by examiner

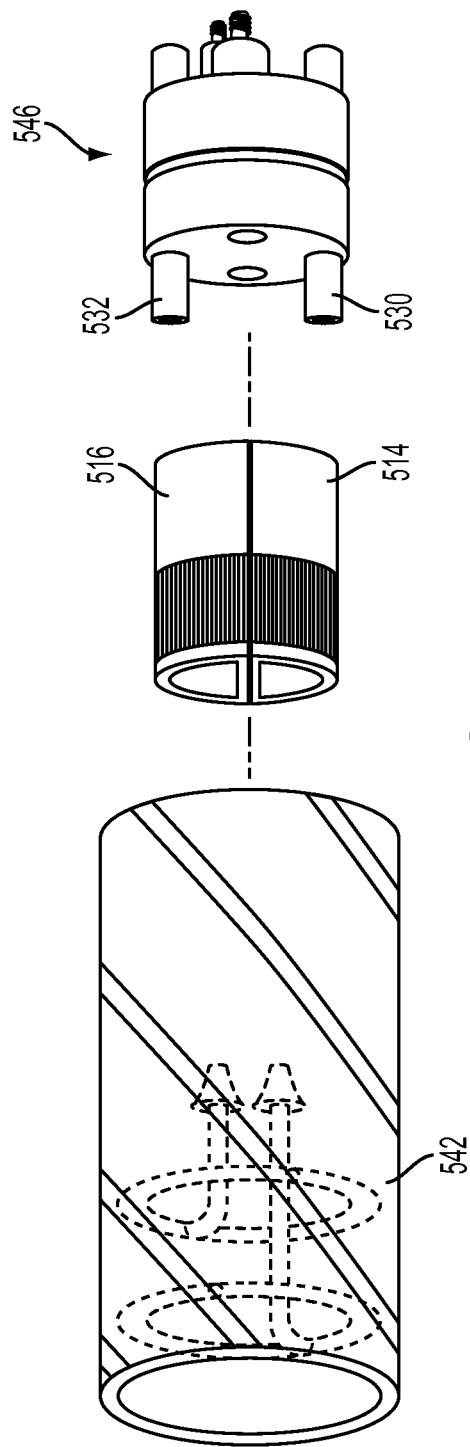

ELECTROLYTIC GAS GENERATING DEVICES, ACTUATORS, AND METHODS

FIELD

The present disclosure relates generally to the field of gas generation, and more particularly to electrolytic gas generating devices, actuators, and methods.

BACKGROUND

Electrolytic gas generation may be used in a variety of applications, including in the production of certain elemental materials and compounds, electrometallurgy, anodization, electroplating, etching, and gas-based actuation. For example, in the field of drug delivery, an electrolytic cell may be used as a gas pump to drive a drug or other active agent from a reservoir. More generally, electrolytic cells can be used to separate materials and/or generate gases for collection.

It would be desirable to provide improved electrolytic gas generating devices and methods that miniaturize this concept and allow for localized and isolated gas generation.

SUMMARY

In one aspect, an electrochemical actuator is provided, including: (i) a first electrode layer having a first electrically conductive region and a plurality of isolated first electrodes configured to allow a first generated gas to be released therethrough, (ii) a sealing layer adjacent the first electrode layer and having a second electrically conductive region and a plurality of isolated multi-electrode assemblies, each multi-electrode assembly including an ionic material layer having a first side including a cathode material and a second side including an anode material, and (iii) a second electrode layer adjacent the sealing layer on a side opposite the first electrode layer and having a third electrically conductive region and a plurality of isolated second electrodes, each second electrode being configured to allow a second generated gas to be released therethrough and being operably associated with an isolated electrical connector. Each of the first electrodes is aligned with one of the multi-electrode assemblies and one of the second electrodes, to form a plurality of isolated stacks in which the isolated electrical connector and the first electrically conductive region are in electrical communication with opposing sides of the multi-electrode assembly. The first, second, and third electrically conductive regions are in electrical communication. The actuator is configured to independently generate the first and second gases from each of the stacks via electrolysis upon application of a voltage to the isolated electrical connector associated with the stack and to the third electrically conductive region.

In another aspect, a gas generating device is provided, including: (i) a first electrode layer having a first electrically conductive region and at least one first perforated electrode configured to allow a first generated gas to be released therethrough, (ii) a sealing layer adjacent the first electrode layer and having a second electrically conductive region and at least one multi-electrode assembly, each multi-electrode assembly including an ionic material layer having a first side including a cathode material and an opposed second side including an anode material, and (iii) a printed circuit board adjacent the sealing layer on a side opposite the first electrode layer and having a third electrically conductive region and at least one second perforated electrode patterned on the printed circuit board, each second perforated electrode being configured to allow a second generated gas to be released therethrough and being operably associated with an isolated electrical connector. The first electrically conductive region is in electrical communication with one side of each multi-electrode assembly and each isolated electrical connector is in electrical communication with an opposing side of one of the at least one multi-electrode assemblies. The first, second, and third electrically conductive regions are in electrical communication. The device is configured to generate the first and second gases upon application of a voltage to the isolated electrical connector and to the third electrically conductive region.

In yet another aspect, a method of generating hydrogen and oxygen is provided, including: (i) providing a device which includes: (a) a first electrode layer having a first electrically conductive region and a plurality of isolated first electrodes, (b) a sealing layer adjacent the first electrode layer and having a second electrically conductive region and a plurality of isolated multi-electrode assemblies, each multi-electrode assembly including an ionic material layer having a first side including a cathode material and a second side including an anode material, and (c) a second electrode layer adjacent the sealing layer on a side opposite the first electrode layer and having a third electrically conductive region and a plurality of isolated second electrodes, each second electrode being associated with an isolated electrical connector, wherein the first electrically conductive region is in electrical communication with one side of each multi-electrode assembly and each electrical connector is in electrical communication with an opposing side of one of the multi-electrode assemblies, wherein the first, second, and third electrically conductive regions are in electrical communication, and wherein each of the first electrodes is aligned with one of the multi-electrode assemblies and one of the second electrodes, to form a plurality of isolated stacks in contact with water; and (ii) applying a voltage to the isolated electrical connector operably associated with one of the stacks and to the third electrically conductive region to selectively hydrolyze the water and thereby generate gaseous hydrogen and oxygen which are respectively released through the isolated first and second electrodes of said stack.

BRIEF DESCRIPTION OF THE DRAWINGS

FIG. 5 is an exploded perspective view illustrating one embodiment of a drug delivery device having an electrolytic actuator.

DETAILED DESCRIPTION

The electrolytic devices, actuators, and methods described herein provide for isolated and localized gas generation. Generally, electrolytic gas generation occurs when electric current is passed through an ionic substance to cause chemical reactions at the electrodes that result in the separation of materials. For example, when a voltage is applied to an actuator configured to electrolyze water, $O_2$ and $H_2$ gases are generated by the electric current running through the ionic material, which separates materials at the electrodes.

The actuators and methods described herein are advantageously configured to provide isolated electrical connectivity for one or more electrolysis chambers to provide localized on-demand gas generation. Thus, the actuators allow for the independent actuation of multiple electrolysis chambers in a single device. Moreover, the actuators are configured so that their structure may be miniaturized for use in micro-scale applications. These actuators and methods may be used in any device or application that involves the generation of gases and/or rely on gas generation for actuation. For example, the actuators may be used within drug delivery devices to drive one or more drug formulations from a device.

Actuators, devices, and methods for electrolytic gas generation are discussed in further detail below.

Actuators/Devices

Figure 1:
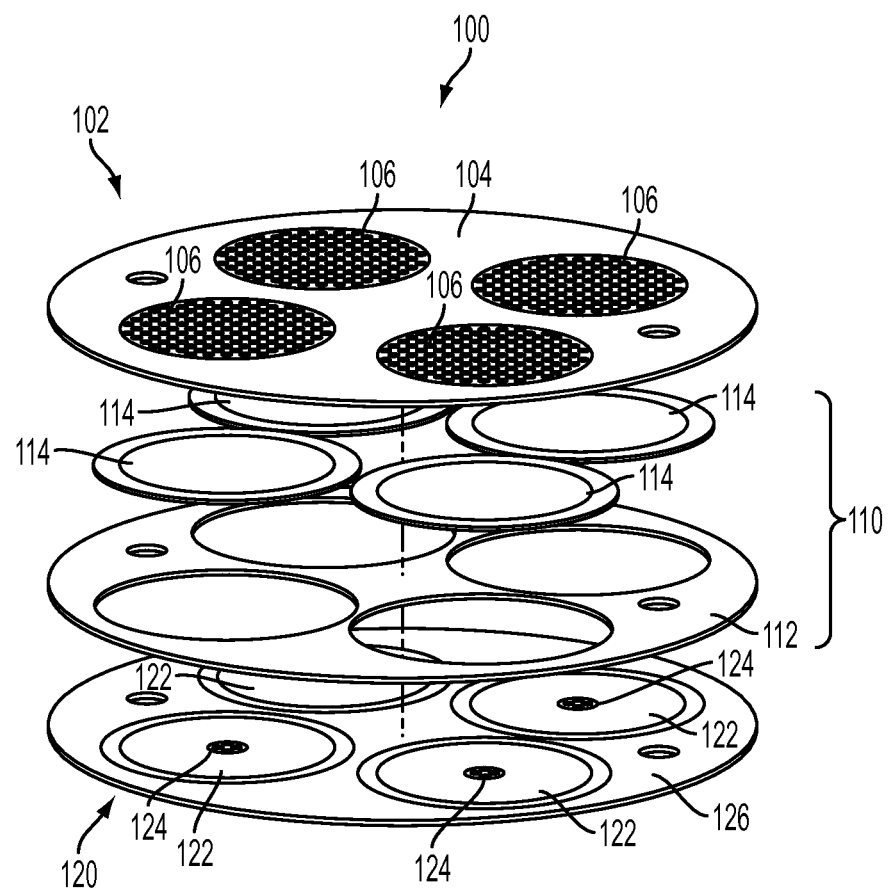
FIG. 1 is an exploded perspective view illustrating one embodiment of an electrolytic actuator.

In certain embodiments, electrochemical actuators are provided to independently generate one or more gases. In one embodiment, as shown in FIG. 1, the electrochemical actuator 100 includes a first electrode layer 102 having a first electrically conductive region 104 and a plurality of isolated first electrodes 106 configured to allow a first generated gas to be released therethrough. The actuator 100 also includes a sealing layer 110 adjacent the first electrode layer 102 and having a second electrically conductive region 112 and a plurality of isolated multi-electrode assemblies 114. Each multi-electrode assembly 114 includes an ionic material layer having a first side including a cathode material and a second side including an anode material. A second electrode layer 120 is adjacent the sealing layer 110 on a side opposite the first electrode layer 102. The second electrode layer 120 includes a third electrically conductive region 126 and a plurality of isolated second electrodes 122, each second electrode being configured to allow a second generated gas to be released therethrough and being operably associated with an isolated electrical connector 124. Each of the first electrodes 106 is aligned with one of the multi-electrode assemblies 114 and one of the second electrodes 122, to form a plurality of isolated stacks in which the isolated electrical connector 124 and the first electrically conductive region 104 are in electrical communication with opposing sides of the multi-electrode assembly 114. The first, second, and third electrically conductive regions 104, 112, 126 are in electrical communication. The actuator 100 is configured to independently generate the first and second gases from each of the stacks via electrolysis upon application of a voltage to the isolated electrical connector 124 associated with the stack and to the third electrically conductive region 126.

The isolated first and second electrodes may have any configuration that allows the generated gases to be released therethrough. In one embodiment, the first and/or second electrodes are perforated electrodes, for example having an array of apertures therethrough.

The ionic material may include any suitable electrolyte known to those of ordinary skill in the art. In one embodiment, the ionic material layer includes a hygroscopic material. As used herein, the term "hygroscopic" refers to the ability of the material layer to attract water molecules from the surrounding environment. For example, where the actuator is used in an implantable drug delivery device, the hygroscopic material layer may be configured to absorb water or fluid from an implantation site. In one embodiment, the hygroscopic material is a sulfonated tetrafluoroethylene based fluoropolymer-copolymer which is highly selective and permeable to water, such as Nafion. Other ionic materials may include ionic solutions, hydrogels, and other fluids that can be electrolyzed to generate gaseous products. In one embodiment, the cathode material includes platinum black and/or the anode material includes iridium-ruthenium oxide.

In one embodiment, as shown in FIG. 1, each isolated electrical connector 124 is in electrical communication with one side of the multi-electrode assembly 114 associated with the stack in which the isolated electrical connector 124 is disposed. As used herein, the term "isolated electrical connector" refers to the electrical connector being electrically isolated from the third electrically conductive region of the second electrode layer. For example, the electrical isolation of the connector may be achieved by manufacturing methods known in the art, such as printed circuit board manufacturing methods including etching. In certain embodiments, each stack is electrically isolated from every other stack of the actuator, such that each gas generating stack may be independently operated. For example, each isolated electrical connector may include at least one via. Other forms of electrical contact to the second electrodes may also be used, such as flex-cables, for example metal on a flexible polymer substrate, printed circuit boards, screw-based contact, and soldering wires.

In one embodiment, as shown in FIG. 1, the first electrically conductive region 104 is in electrical communication with the side of the multi-electrode assembly 114 adjacent the first electrodes 106. In one embodiment, the first, second, and third electrically conductive regions 104, 112, 126 of the layers 102, 110, 120 are in electrical communication such that a voltage may be applied at the third electrically conductive region 126 to achieve an electrical connection at the side of the multi-electrode assembly 114 adjacent the first electrodes 106. Thus, a voltage may be applied to the first, second, or third electrically conductive regions to achieve the electrical connection at the side of the multi-electrode assembly adjacent the first electrodes. In one embodiment, a voltage is applied to the third electrically conductive region on a side opposite the multi-electrode assemblies, such that the voltage to both the cathode and anode sides of the multi-electrode assemblies is provided at a single side of the actuator. Thus, the electrical connection to the actuator may only be required at one end of the device.

Figure 3:
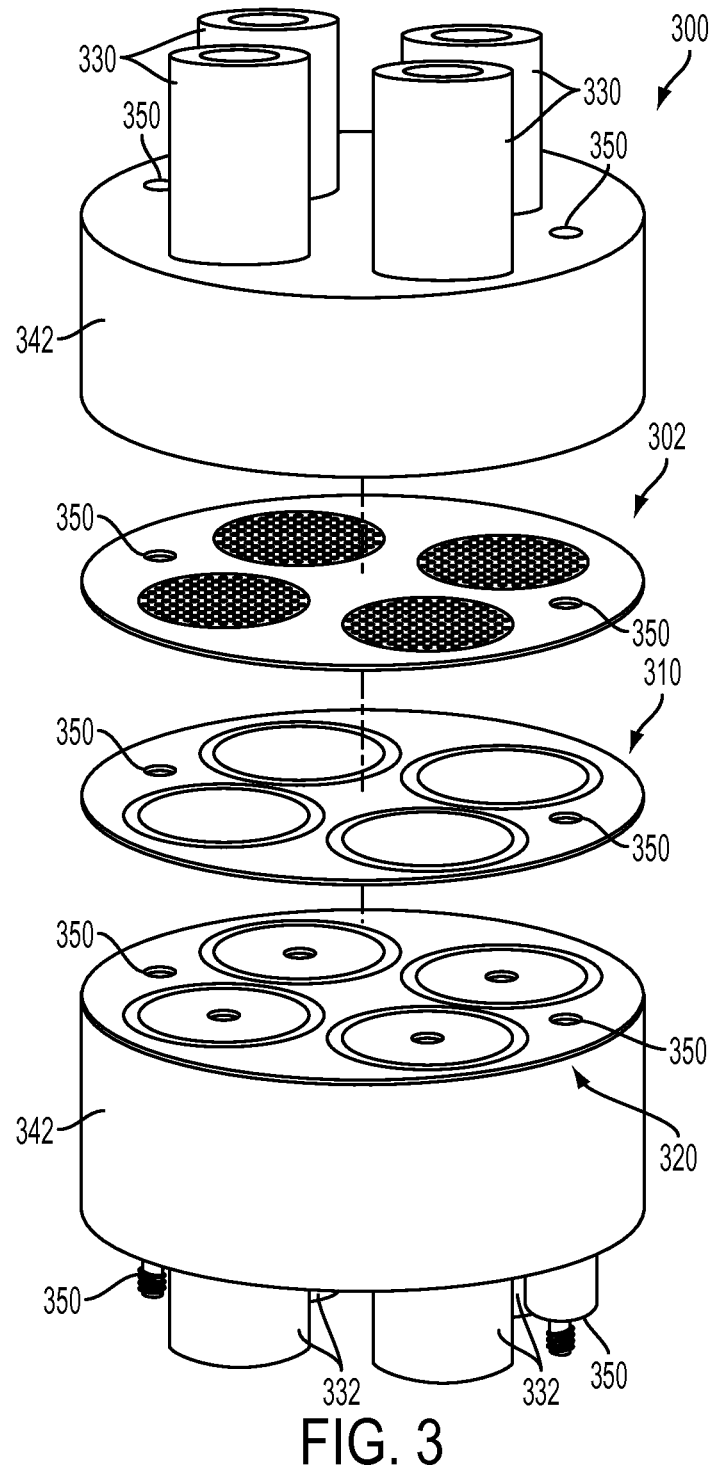
FIG. 3 is an exploded perspective view illustrating one embodiment of an electrolytic actuator.

As used herein, the term "electrically conductive region" refers to any layer configuration that provides the necessary electrical connection between the layers. For example, the electrically conductive regions may include an electrically conductive material making up all or some portion of the layer. In one embodiment, as shown in FIG. 3, the electrical connection between layers 302, 310, and 320 is achieved via screw assemblies 350. For example, the layers may be arranged such that screws are used for both fastening and providing electrical contacts to the anode or cathode layer of the multi-electrode assembly adjacent the first electrode. A low-resistance and uniform electrical contact along the surface of the ionic material may be achieved by using planar first electrodes, such as perforated electrodes, having holes therein to allow the screws to pass therethrough. Other forms of electrical contact to the first electrodes may also be used, such as flex-cables, for example metal on a flexible polymer substrate, printed circuit boards, screw-based contact, and soldering wires.

In one embodiment, the sealing layer includes a conductive epoxy that forms at least a portion of the second electrically conductive region. For example, the sealing layer may include silver epoxy or any other conductive epoxy known in the art. In another embodiment, the second electrically conductive region is not formed from the sealing material. For example, the second electrically conductive region may be formed of a non-adhesive conductive metal. In certain embodiments, the second electrically conductive region forms only a portion of the sealing layer distinct from the multi-electrode assemblies. For example, the sealing layer may include solder, a pressure sensitive adhesive, or any suitable conductive or non-conductive sealant known in the art. In certain embodiments, the sealing layer is configured such that the actuator is sealed from gas leakage other than through the electrode pathways.

As used herein, the term "multi-electrode assembly" refers to a structure including an ionic material having electrodes materials on either side thereof. For example, the electrode materials may be coated on the ionic material to form a cathode and anode. In certain embodiments, the sealing layer is configured such that the first side of each multi-electrode assembly faces the first electrode layer and the second side of each multi-electrode assembly faces the second electrode layer. That is, the cathode material faces the first electrode layer and the anode material faces the second electrode layer. Alternatively, the sealing layer may be configured such that the second side of each multi-electrode assembly faces the first electrode layer and the first side of each multi-electrode assembly faces the second electrode layer. Thus, the cathode and anode ends may be interchanged based on the desired gas generation and device structure.

The first and second electrode layers may be made of a variety of suitable materials including but not limited to metals and polymers. For example, the electrode layers may be made of a variety of materials including metallized substrates, conductive and/or metallized polymers. In one embodiment, the electrode layers are made of porous planar metallized polymer substrates such as metallized polyester or metallized PEN. In one embodiment, the electrode layers are made of a compliant polymer, such as polypropylene.

In one embodiment, as shown in FIG. 1, the first electrode layer 102 includes a conductive metal shim, which serves at least in part as the first electrically conductive region. The conductive metal shim may be formed of any suitable conductive material known in the art. For example, the shim may be a copper shim. In certain embodiments, the first electrode layer may be only partially formed of a conductive material. In one embodiment, the second electrode layer is a printed circuit board and the second electrodes are patterned on the printed circuit board. As used herein, the term "printed circuit board" refers to a non-conductive substrate onto which features, such as conductive features, may be printed, or laminated.

The first and second electrode layers may be formed of any suitable electrically conductive materials known in the art. In one embodiment, the first and second electrodes include gold coated copper. The first and second electrode layers may be arranged to be in contact with the multi-electrode assemblies on either side. In certain embodiments, the first and second electrodes are configured such that they compress the multi-electrode assemblies therebetween to achieve the necessary Ohmic contact with the multi-electrode assemblies to provide the necessary current thereto. The electrode layers may be permeable to provide access to the multi-electrode assemblies, for example the electrodes may include fabricated and/or naturally occurring macroscopic or microscopic pores. In certain embodiments, both the anode and cathode are patterned and/or perforated such that gas may be delivered therethrough at an isolated region. That is, the actuator may be configured such that the gas at one or both ends of a stack may be collected and/or dispensed in a controlled manner.

Generally, the actuator is configured to generate the first and second gases via electrolysis upon application of a voltage to the actuator. The structure of actuators disclosed herein advantageously provides for application of a voltage at only one end, such that electrical connectivity to only one end of the actuators is required. As compared to known actuators that require a voltage be applied at both ends, the presently disclosed actuators advantageously allow for use in a wider variety of applications, including micro-scale applications, because voltage is only required at one end.

In certain embodiments, the actuator is configured to electrolyze water and produce hydrogen as the first generated gas and oxygen as the second generated gas. The reaction at the anode is described by EQ. 1. In the water, at the negatively charged cathode, a reduction reaction takes place, with electrons from the cathode being given to the hydrogen cations to form hydrogen gas as shown in EQ. 2.

$$2H_2O(l) \rightarrow O_2(g) + 4H^+(aq) + 4e^- \qquad \text{EQ. 1}$$

$$2H^+(aq) + 2e^- \rightarrow H_2(g) \qquad \text{EQ. 2}$$

In certain embodiments, gas generating devices and actuators including these devices are provided. In one embodiment, as shown in FIG. 1, the actuator 100 includes a gas generating device, which includes: (i) a first electrode layer 102 having a first electrically conductive region 104 and at least one first perforated electrode 106 configured to allow a first generated gas to be released therethrough; (ii) a sealing layer 110 adjacent the first electrode layer 102 and having a second electrically conductive region 112 and at least one multi-electrode assembly 114, each multi-electrode assembly 114 including an ionic material layer having a first side including a cathode material and an opposed second side including an anode material; and (iii) a printed circuit board 120 adjacent the sealing layer 110 on a side opposite the first electrode layer 102 and including a third electrically conductive region 126 and at least one second perforated electrode 122 patterned on the printed circuit board 120, each second perforated electrode being configured to allow a second generated gas to be released therethrough and being operably associated with an isolated electrical connector 124, wherein the first electrically conductive region 104 is in electrical communication with one side of each multi-electrode assembly 114 and each isolated electrical connection 124 is in electrical communication with the opposing side of one of the at least one multi-electrode assemblies, the first, second, and third electrically conductive regions are in electrical communication, and the device is configured to generate the first and second gases upon application of a voltage to the isolated electrical connector and to the third electrically conductive region. That is, each device may include one or more gas generating stacks.

In certain embodiments, an actuator includes a gas generating device having at least one isolated stack and a displacement system operable via a force produced by a gas from the generating device. For example, the displacement system may be configured to drive a piston or drug formulation via a positive displacement process.

Methods

In certain embodiments, methods of generating hydrogen and oxygen are provided. In one embodiment, a method includes: (i) providing a device including: (a) a first electrode layer having a first electrically conductive region and a plurality of isolated first electrodes, (b) a sealing layer adjacent the first electrode layer and including a second electrically conductive region and a plurality of isolated multi-electrode assemblies, each multi-electrode assembly having an ionic material layer having a first side including a cathode material and a second side including an anode material, and (c) a second electrode layer adjacent the sealing layer on a side opposite the first electrode layer and including a third electrically conductive region and a plurality of isolated second electrodes, each second electrode being associated with an isolated electrical connector, wherein the first electrically conductive region is in electrical communication with one side of each multi-electrode assembly and each isolated electrical connector is in electrical communication with the opposing side of one of the multi-electrode assemblies, the first, second, and third electrically conductive regions are in electrical communication, and each of the first electrodes is aligned with one of the multi-electrode assemblies and one of the second electrodes, to form a plurality of isolated connected stacks in contact with water; and (ii) applying a voltage to the isolated electrical connector operably associated with one of the stacks and to the third electrically conductive region to selectively hydrolyze the water and thereby generate hydrogen and oxygen which are respectively released through the isolated first and second electrodes of the stack. For example, the device may include any of the actuator and device features disclosed herein.

In certain embodiments, the hydrogen or oxygen create a driving force in an actuator. For example, the hydrogen or oxygen may create a driving force to drive a piston or drug formulation via positive displacement.

In certain embodiments, the voltage is applied independently to the electrically conductive regions and to the isolated electrical connectors. For example, the voltage may be applied at the first, second, or third electrically conductive region, such that current passes to the electrode layer of the multi-electrode assembly adjacent the first electrode layer. In one embodiment, the voltage is applied at the third electrically conductive region such that the electrical connection is required at only a single end of the device. In other embodiments, the voltage may be applied at any of the electrically conductive regions or between the electrically conductive regions of the various layers in any suitable way to achieve an electrical connection to the electrode layer of the multi-electrode assembly adjacent the first electrode layer. For example, applying the voltage to the isolated electrical connector associated with the stack and to the third electrically conductive region may include passing current from the isolated electrical connector to the third electrically conductive region or from the third electrically conductive region to the isolated electrical connector. That is, passing current through the stack from the isolated electrical connector to the third electrically conductive region, or vice versa, could also achieve the desired electrical connectivity for the device.

Applications/Uses

The devices, actuators, and methods disclosed herein may be used in a variety of application, such as applications requiring the generation of gas via electrolysis and/or fuel cell based applications. In one embodiment, an actuator is provided as a component of a drug delivery device that may be used for various medical and therapeutic applications in human and animal subjects, as well as in animal husbandry. Actuators, drug delivery devices, and methods are disclosed in U.S. patent application Ser. No. 13/629,124 entitled "SINGLE CHANNEL, MULTIPLE DRUG DELIVERY DEVICE AND METHODS," Ser. No. 13/629,159 entitled "MULTIPLE RESERVOIR DRUG DELIVERY DEVICE AND METHODS," Ser. No. 13/629,184 entitled "DRUG RECONSTITUTION AND DELIVERY DEVICE AND METHODS," and Ser. No. 14/071,929, entitled "FLUID DELIVERY DEVICES AND METHODS," the disclosures of which are incorporated herein by reference in pertinent part.

Figure 2:
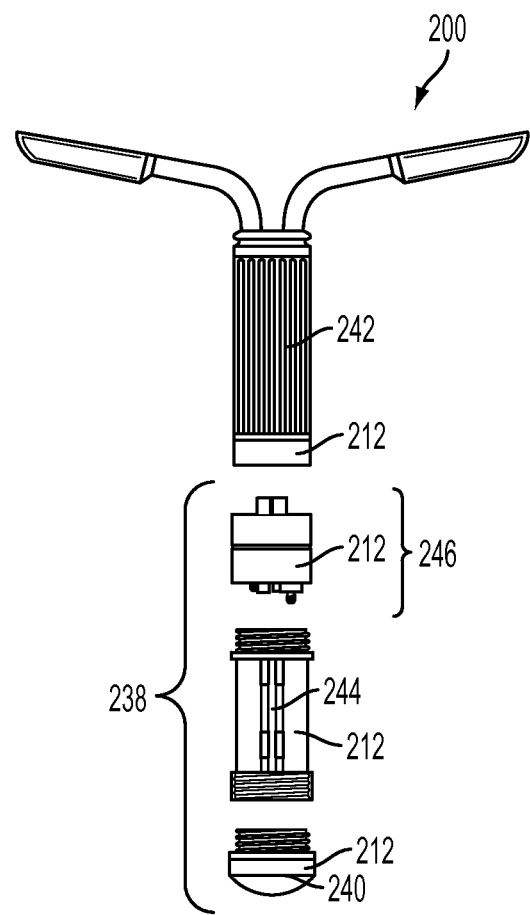
FIG. 2 is an exploded perspective view illustrating one embodiment of an implantable drug delivery device having an electrolytic actuator.

In certain embodiments, a drug delivery device includes an electrochemical actuator as disclosed herein, wherein the actuator is configured to drive at least one drug from one or more drug-containing reservoirs. As shown in FIG. 2, in one embodiment, a drug delivery device 200 includes a housing 212, a porous wall 242 for delivering a drug therefrom, and an actuation system 238. The actuation system 238 may include a power source 240, a microcontroller 244, and an actuator 246. The actuator of the actuation system may include one or more electrically isolated stacks as described above, and a shared power source and microcontroller. Alternatively, each stack may be associated with an independent power source and/or microcontroller.

As shown in FIG. 3, in one embodiment, the actuator 300 includes first and second electrode layers 302 and 320, and sealing layer 310, which form four isolated actuator stacks and are contained within housing 342. Housing 342 includes gas release channels 330 and 332 that are configured to correspond to the isolated actuator stacks. For example, the gas release channels may be in isolated communication with the stacks, such that the generated gas from one stack is released only from the release channel in communication therewith. As shown in FIG. 3, actuator 300 also includes screw assemblies 350, which allow the layers of the actuator and housing to be mechanically secured and provides the electrical communication between the first, second, and third electrically conductive regions. In certain embodiments, the layers may be secured by chemical or thermal surface modification (including but not limited to epoxies and adhesives), welding, or soldering, alone or in combination with mechanical securing. In certain embodiments, an actuator housing is not necessary and the first and second electrode layers and sealing layer may be incorporated directly into a device via any suitable configuration. In one embodiment, an assembled actuator having two stacks has a diameter of about 25 mm and a height of about 20 mm. Other dimensions are also envisioned.

Figure 4A:
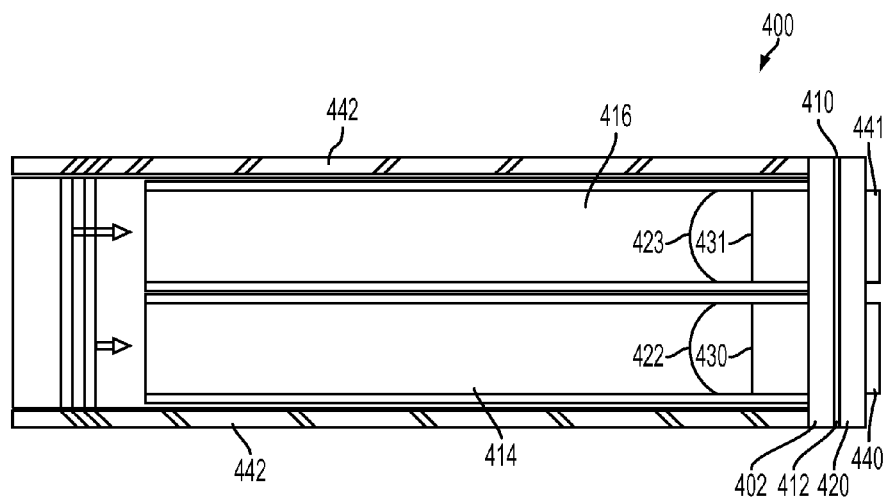
FIG. 4A is a cross-sectional view illustrating one embodiment of a drug delivery device having an electrolytic actuator.
Figure 4B:
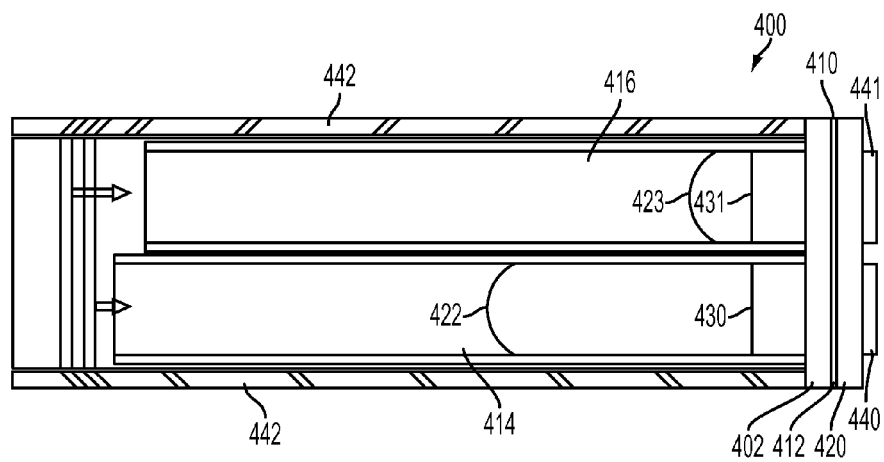
FIG. 4B is a cross-sectional view illustrating the drug delivery device of FIG. 4A with one stack of the electrolytic actuator having generated a gas.

In certain embodiments, each of the plurality of isolated stacks is in operable communication with a drug-containing reservoir, such that each stack is configured to generate the first generated gas to drive the at least one drug from the drug-containing reservoir in communication therewith. For example, as shown in FIGS. 4A and 4B, drug delivery device 400 includes two drug reservoirs 414 and 416 contained within a housing including a permeable membrane wall 442 for delivering the drug(s) to an area adjacent the device. Each reservoir 414, 416 is in communication with an inflatable membrane 422, 423 that is configured to advance through the reservoir 414, 416 in response to the force of the displacement gas, and drive the drug(s) from the reservoir 414, 416 and out of the device 400. Alternatively, each reservoir may contain a plug or piston that is configured to be advanced by the force of the generated gas. The plug may be a fluid or solid material.

In certain embodiments, the gases generated by independent stacks may be collected and mixed to produce a higher volume of gas at a particular location in the structure.

As shown in FIGS. 4A and 4B, in one embodiment, actuation system 410 is operably connected to the reservoirs 414, 416 such that the generated gases are provided to the inflatable membranes 422, 423 via channels 430, 431. For example, the actuator may be configured such that the first electrode layer 402 is a cathode layer and the second electrode layer 420 is an anode layer, such that upon application of a voltage to the isolated electrical connector and to the third electrically conductive region, hydrogen is generated and released via channels 430 and 431 and oxygen is generated and released via channels 440 and 441. In this embodiment, sealing layer 412 includes multi-electrode assemblies having an ionic material layer with a cathode material side facing the cathode layer 402 and an anode material side facing the anode layer 420. In another embodiment, the positions of the electrode layers and the cathode and anode sides of the multi-electrode assemblies are reversed such that oxygen is generated and released to drive the drug(s) from the reservoirs. In such an embodiment, the isolated electrical connector would be provided at the cathode layer, and the voltage would be supplied to the isolated electrical connector and to the third electrically conductive region.

Another embodiment of a drug delivery device is shown in FIG. 5. The device includes permeable wall 542, from which drug(s) are dispensed upon positive displacement of the drug(s) from reservoirs 514, 516. Actuator 546 is configured such that channels 530, 532 are in isolated communication with the reservoirs 514, 516. Upon selective application of a voltage to the third electrically conductive region and to one or more isolated electrical connectors of the actuator 546, gas is generated from the corresponding actuator stack and is subsequently released via the corresponding channel 530, 532 to the reservoir 514, 516. The generated gas drives the drug(s) from the reservoir and device via positive displacement.

The power source may be any source of mechanical, electrical power or electromechanical power. The power source may include one or more batteries or fuel cells. In certain embodiments, an electrical potential of about 1.0V or greater may be applied to the third electrically conductive region and one or more isolated electrical connectors of the actuator to generate gases at the electrode layers. Alternatively, the voltage may be applied to the actuator in another way that results in an isolated electrical connection being achieved at both the anode and cathode sides of the multi-electrode assemblies. For example, instead of applying a voltage to the third electrically conductive region, a voltage may be applied at the second or first electrically conductive region.

The microcontroller may be configured to control the actuation system of the device, and thereby control the timing of release of the fluids. For example, the microcontroller may selectively transmit electrical and/or mechanical power to one or more stacks of the actuator, to selectively generate one or more gases. In certain embodiments, the microcontroller is configured to control the timing of delivery of the drug(s) by applying the necessary electrical potentials to the actuator to generate the gases and positively displace the drug(s) in the reservoirs. The controller may be programmable or it may be pre-programmed to release the gas(es) in accordance with a prescribed (predetermined) release schedule.

In certain embodiments, a channel or port is provided in the housing or actuator structure to allow fluid from the surrounding environment to hydrate the ionic material. For example, the gas release channels may allow water to access the electrode layers and multi-electrode assemblies. In one embodiment, an implantable drug delivery device may include a port to allow aqueous secretions from the surrounding mucosal tissue to contact the cathode and anode. In one embodiment, water or an aqueous solution is contained on-board the actuator or device. For example, the actuator or device may include a reservoir containing an electrolytic solution, for example an ionic solution such as sodium nitrite. In one embodiment, the device includes a reservoir containing deionized water and a solid electrolyte contacting the surfaces of the electrodes.

In order to ensure uniform hydration and gas collection from the ionic material, the electrode layers may include flow-fields to help maximize the amount of gas generated and collected from the ionic material. The flow-field pattern can be any shape or pattern configured to maximize the accessible area of the ionic material, and thereby maximize the amount of gas produced and collected. For example, the flow-fields may include a meandering conduit. Gas-permeable substrates may also be used to maximize gas generation and collection.

It will be appreciated that variants of the above-disclosed and other features and functions, or alternatives thereof, may be combined into many other different devices, systems, methods, or applications. Various presently unforeseen or unanticipated alternatives, modifications, variations, or improvements therein may be subsequently made by those skilled in the art which are also intended to be encompassed by the following claims.

The invention claimed is:

1. An electrochemical actuator, comprising:
   a first electrode layer comprising a first electrically conductive region and a plurality of isolated first electrodes configured to allow a first generated gas to be released therethrough;
   a sealing layer adjacent the first electrode layer and comprising a second electrically conductive region and a plurality of isolated multi-electrode assemblies, each multi-electrode assembly comprising an ionic material layer having a first side comprising a cathode material and a second side comprising an anode material; and
   a second electrode layer adjacent the sealing layer on a side opposite the first electrode layer and comprising a third electrically conductive region and a plurality of isolated second electrodes, each second electrode being configured to allow a second generated gas to be released therethrough and being operably associated with an isolated electrical connector,
   wherein each of the first electrodes is aligned with one of the multi-electrode assemblies and one of the second electrodes, to form a plurality of isolated stacks in which the isolated electrical connector and the first electrically conductive region are in electrical communication with opposing sides of the multi-electrode assembly,
   wherein the first, second, and third electrically conductive regions are in electrical communication,
   wherein the actuator is configured to independently generate the first and second gases from each of the stacks via electrolysis upon application of a voltage to the isolated electrical connector associated with the stack and to the third electrically conductive region.

2. The actuator of claim 1, wherein the ionic material layer comprises a hygroscopic material.

3. The actuator of claim 2, wherein the hygroscopic material comprises nafion.

4. The actuator of claim 1, wherein each isolated electrical connector comprises at least one via.

5. The actuator of claim 1, wherein the first and/or second electrodes comprise perforated electrodes.

6. The actuator of claim 1, wherein the sealing layer comprises a conductive epoxy.

7. The actuator of claim 6, wherein the sealing layer comprises silver epoxy.

8. The actuator of claim 1, wherein the sealing layer comprises solder or a pressure sensitive adhesive.

9. The actuator of claim 1, wherein the first electrode layer comprises a conductive metal shim.

10. The actuator of claim 9, wherein the shim comprises copper.

11. The actuator of claim 1, wherein the cathode material comprises platinum black and the anode material comprises iridium-ruthenium oxide.

12. The actuator of claim 1, wherein the first and second electrodes comprise gold coated copper.

13. The actuator of claim 1, wherein the sealing layer is configured such that the first side of each multi-electrode assembly faces the first electrode layer and the second side of each multi-electrode assembly faces the second electrode layer.

14. The actuator of claim 1, wherein the sealing layer is configured such that the second side of each multi-electrode assembly faces the first electrode layer and the first side of each multi-electrode assembly faces the second electrode layer.

15. The actuator of claim 1, wherein the second electrode layer comprises a printed circuit board and the second electrodes are patterned on the printed circuit board.

16. A drug delivery device comprising the electrochemical actuator of claim 1, wherein the actuator is configured to drive at least one drug from one or more drug-containing reservoirs.

17. The actuator of claim 16, wherein each drug-containing reservoir is in operable communication with one of the plurality of isolated stacks, such that each stack is configured to generate the first generated gas to drive the at least one drug from the drug-containing reservoir in communication therewith.

18. The actuator of claim 17, wherein the first generated gas is hydrogen.

19. A gas generating device, comprising:
a first electrode layer comprising a first electrically conductive region and at least one first perforated electrode configured to allow a first generated gas to be released therethrough;
a sealing layer adjacent the first electrode layer and comprising a second electrically conductive region and at least one multi-electrode assembly, each multi-electrode assembly comprising an ionic material layer having a first side comprising a cathode material and an opposed second side comprising an anode material; and
a printed circuit board adjacent the sealing layer on a side opposite the first electrode layer and comprising a third electrically conductive region and at least one second perforated electrode patterned on the printed circuit board, each second perforated electrode being configured to allow a second generated gas to be released therethrough and being operably associated with an isolated electrical connector,
wherein the first electrically conductive region is in electrical communication with one side of each multi-electrode assembly and each isolated electrical connector is in electrical communication with an opposing side of one of the at least one multi-electrode assemblies,
wherein the first, second, and third electrically conductive regions are in electrical communication,
wherein the device is configured to generate the first and second gases upon application of a voltage to the isolated electrical connector and to the third electrically conductive region.

20. The device of claim 19, wherein the ionic material comprises nafion or another hygroscopic material.

21. An actuator comprising:
the gas generating device of claim 19; and
a displacement system operable via a force produced by a gas from the generating device.

22. A method of generating hydrogen and oxygen, comprising:
providing a device which comprises:
a first electrode layer comprising a first electrically conductive region and a plurality of isolated first electrodes;
a sealing layer adjacent the first electrode layer and comprising a second electrically conductive region and a plurality of isolated multi-electrode assemblies, each multi-electrode assembly comprising an ionic material layer having a first side comprising a cathode material and a second side comprising an anode material; and
a second electrode layer adjacent the sealing layer on a side opposite the first electrode layer and comprising a third electrically conductive region and a plurality of isolated second electrodes, each second electrode being associated with an isolated electrical connector,
wherein the first electrically conductive region is in electrical communication with one side of each multi-electrode assembly and each isolated electrical connector is in electrical communication with an opposing side of one of the multi-electrode assemblies,
wherein the first, second, and third electrically conductive regions are in electrical communication,
wherein each of the first electrodes is aligned with one of the multi-electrode assemblies and one of the second electrodes, to form a plurality of isolated stacks in contact with water; and
applying a voltage to the isolated electrical connector operably associated with one of the stacks and to the third electrically conductive region to selectively hydrolyze the water and thereby generate hydrogen and oxygen which are respectively released through the isolated first and second electrodes of said stack.

23. The method of claim 22, wherein the hydrogen or oxygen create a driving force in an actuator.

* * * * *